United States Patent [19]

Hills

[11] Patent Number: 5,066,241

[45] Date of Patent: Nov. 19, 1991

[54] ELECTRICAL CONNECTOR APPARATUS FOR USE WITH AN INTEGRATED CIRCUIT CARD

[75] Inventor: Robert G. Hills, Spencerport, N.Y.

[73] Assignee: Eastman Kodak Company, Rochester, N.Y.

[21] Appl. No.: 539,653

[22] Filed: Jun. 18, 1990

[51] Int. Cl.[5] .................................................. H01R 13/15
[52] U.S. Cl. ....................................... 439/260; 439/635
[58] Field of Search ................ 439/260, 267, 325, 327, 439/328, 635, 59, 630

[56] References Cited

U.S. PATENT DOCUMENTS

| R. 32,559 | 12/1987 | Fedder et al. | 439/325 |
|---|---|---|---|
| 3,871,733 | 3/1975 | Praeger et al. | 439/325 |
| 4,208,681 | 6/1980 | Hatchett | 360/97 |
| 4,236,667 | 12/1980 | Crowley et al. | 439/260 |
| 4,352,492 | 10/1982 | Smith | 439/138 |
| 4,526,433 | 7/1985 | Tanaka | 439/301 |
| 4,592,608 | 6/1986 | Ohtsuka et al. | 439/260 |
| 4,652,976 | 3/1987 | Fushimoto | 439/31 |
| 4,696,529 | 9/1987 | Verhoeven et al. | 439/267 |
| 4,721,348 | 1/1988 | Mouissie | 439/328 |
| 4,724,310 | 2/1988 | Shimamura et al. | 439/325 |
| 4,774,399 | 9/1988 | Fujita et al. | 235/144 |
| 4,801,272 | 1/1989 | Kanazawa et al. | 439/153 |
| 4,810,200 | 3/1989 | Sakamoto | 439/155 |
| 4,961,710 | 10/1990 | Komatsu | 439/260 |

FOREIGN PATENT DOCUMENTS 0284431  9/1988  European Pat. Off. ............ 439/630

Primary Examiner—Paula A. Bradley
Assistant Examiner—Hein D. Vu
Attorney, Agent, or Firm—David M. Woods

[57] ABSTRACT

An electrical connector includes a housing having a recess for receiving an integrated circuit card containing integrated circuit elements and a contact pattern. The connector includes flexible electrodes pretensioned to project into the recess and connect with the contact pattern of an inserted card. A card-engaging lever is supported for entry into the recess from a side of the housing opposed to the flexible electrodes. By biasing the lever toward the electrodes, the integrated circuit card is captured therebetween and tensioned from opposing sides thereof to effect electrical connection. By further providing the card with a spring-loaded shutter and a locking slot opposite to the contact pattern, the lever engages the locking slot and the card is secured in the recess against the resilient bias of the spring-loaded shutter.

16 Claims, 5 Drawing Sheets

ELECTRICAL CONNECTOR APPARATUS FOR USE WITH AN INTEGRATED CIRCUIT CARD

BACKGROUND OF THE INVENTION

1. Field of the Invention

The present invention relates to an electrical connector for receiving a removable integrated circuit card and for making electrical contact with integrated circuit elements supported within the card.

2. Description Relative to the Prior Art

An integrated circuit card encloses one or more integrated circuit elements mounted on a substrate and connected to an electrical contact pattern toward one end of the card. A shutter is provided to cover and protect the contact pattern when the card is removed from an electrical connector and to expose the contact pattern for electrical connection when the card is inserted into the connector. The contact pattern is ordinarily delicate and must be protected against unusual contact force. On the other hand, a good electrical connection requires a positive contact between the contact pattern and contact electrodes in the connector.

The contact electrodes are frequently spring-loaded elements. It is difficult, however, to accurately locate and tension the electrodes so that the card can be easily inserted and reliable contact established. As a result, relatively complex solutions are sometimes seen in the prior art. For example, in U.S. Pat. No. 4,801,272, the contact electrodes are initially withdrawn from the connector and then pivoted into the connector by association with a spring-loaded lever that is driven into motion as a card is inserted. In U.S. Pat. 4,724,310, the contact electrodes are located on a block that is mounted on a carriage for movement along a floor of a card receptacle between a waiting position to an operating position in which the electrodes are moved up against the card. In U.S. Pat. 4,652,976 the electrodes remain fixed in place and, instead, the integrated circuit card is physically moved after insertion. The card is inserted onto a guide plate that rotates the card toward a press-contact type connector. Consequently, the contact pattern on the memory card never slides over the electrodes in the connector.

The conductive contacts of the contact pattern are on a part of the substrate that is accessible to the electrical connector. The necessary force exerted by the electrodes to effect reliable contact with the substrate contact pattern can wear the contacts after repetitive insertion and removal of the card. Electrical signals are then not properly transmitted. The above-cited patents address this problem as a by-product of electrode movement, that is, the electrodes are physically brought into contact with the pattern after, or in conjunction with, the process of insertion, thereby reducing wear on the contacts. These systems are, however, characterized by relatively complex mechanical or electro-mechanical assemblies for providing electrical connection without causing damage to the pattern during the insertion process.

SUMMARY OF THE INVENTION

I have found that by loosely tensioning the contact electrodes and then bringing a force to bear on the card in directly opposed relation to the electrodes after the card has been inserted, the complex arrangements of the prior art can be avoided without damage to the contact pattern. Moreover, the force brought to bear on the card can include a profile for locking the card in place in the connector.

An electrical connector according to the invention includes a housing having a recess for receiving the integrated circuit card. The connector includes flexible contact means for electrically connecting with the integrated circuit card, the contact means being pretensioned to project into the recess. A card engaging member is supported for entry into the recess in opposed relation to the contact means. By biasing the card engaging member toward the contact means the integrated circuit card is engaged therebetween and tensioned from opposing sides thereof to effect electrical connection between the contact means and the contact area on the card.

In further definition of the invention, the integrated circuit card has a locking slot on a side opposite to the contact pattern, and a spring-loaded shutter for covering the contact pattern. The card-engaging member is a lever having a locking profile toward one end thereof that is pivoted to enter the locking slot and secure the card in the recess. The electronic connector further includes a shutter opener and, in which case, the card is secured in the recess against the resilient bias from the spring-loaded shutter. When the locking profile is withdrawn from the locking slot, the card is ejected from the recess under action of the resilient bias from the spring-loaded shutter acting against the shutter opener.

BRIEF DESCRIPTION OF THE DRAWINGS

The invention will be described in relation to the drawings, in which.

DETAILED DESCRIPTION OF THE INVENTION

Figure 1:
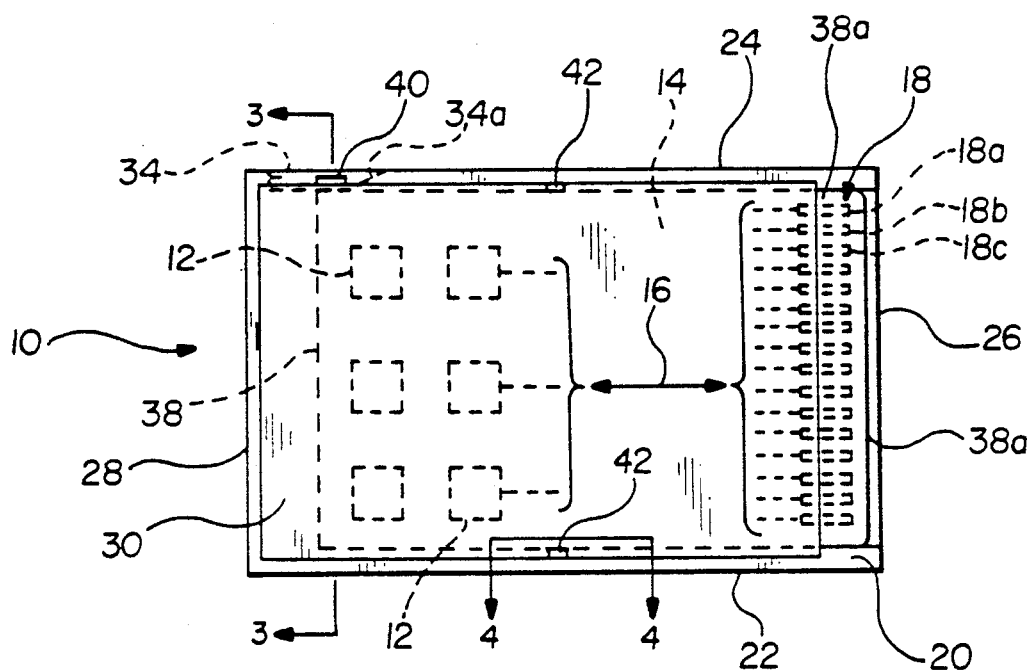
FIG. 1 is a plan view of an integrated circuit card showing the contact pattern area.
Figure 2:
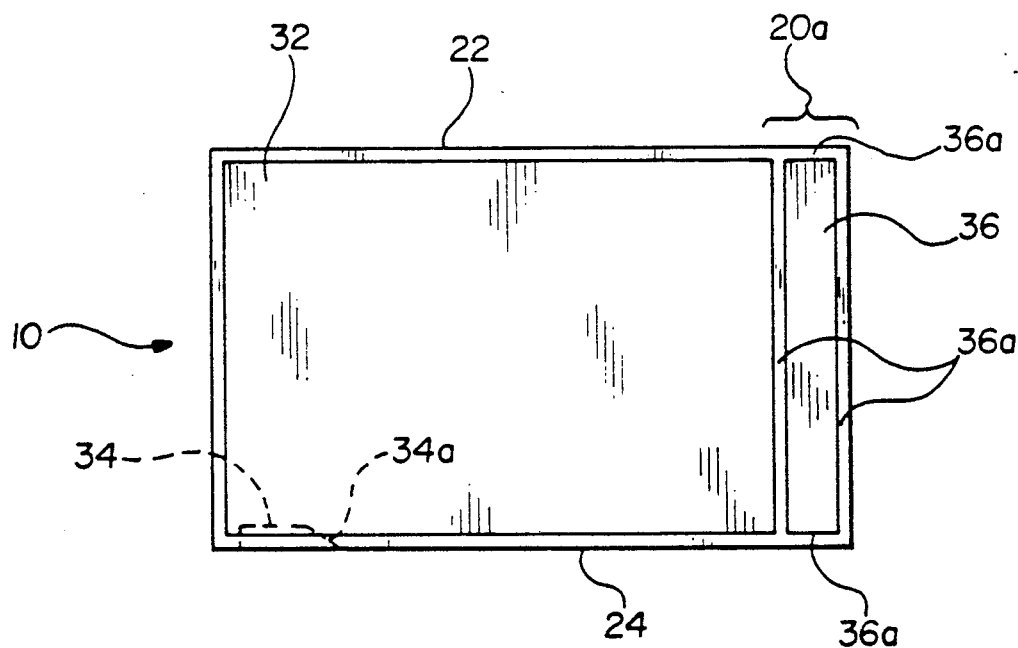
FIG. 2 is a plan view of the integrated circuit card of FIG. 1 as seen from the opposite side.

Since integrated circuit cards are well known, the present description will be directed in particular to elements forming part of, or cooperating more directly with the present invention. Elements not specifically shown or described herein may be selected from those known in the art. For instance, the specific structure of the integrated circuit elements supported in the card is unessential to a description of the invention and therefore such structure will not be described in detail. Likewise, although the card is intended for use with electronic apparatus, the specific details of such apparatus, except for the electrical connector aspects thereof, are unessential to an understanding of the invention.

Referring now to FIGS. 1 through 4, an integrated circuit card 10 is shown for storing and/or processing data in one or more integrated circuit elements 12. A substrate 14 (shown Particularly in FIG. 3) supports the circuit elements 12 and provides electrical connection(s) 16 between the elements 12 and a contact area 18 on one end of the substrate 14. The contact area 18 is composed of a pattern of individually accessible contacts 18a, 18b, 18c, etc. formed on the surface of the substrate 14. A card frame 20 supports the substrate 14, and the circuit elements 12 therewith. The frame 20 includes parallel side walls 22 and 24, a front wall 26 on a forward section of the card 10, and a rear wall 28 on a rearward section of the card 10. (As used herein, "forward" refers to the end of the card 10 that first enters the connector.) The side walls 22 and 24 are stepped on the interiorly-facing sides thereof, as shown particularly in FIG. 3, in order to separately support the substrate 14 in relation to an upper cover 30 and a lower cover 32. An elongated opening recess 34 is located toward the rear wall 28 in the side wall 24. The recess 34 includes an inclined ramp 34a leading into the recess opening at the forward end thereof. The opposite side (FIG. 2) of the frame 20 has an outlined forward section 20a with a locking slot 36 formed therein. The locking slot 36 has a slightly depressed cross-section such that the floor of the slot is surrounded by slightly projecting walls 36a, particularly on the forward and rearward sides thereof.

Figure 3:
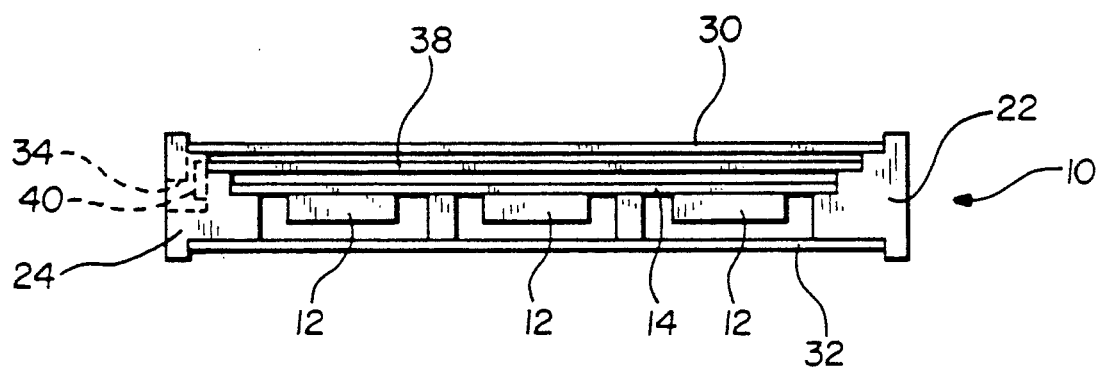
FIG. 3 is a side elevation of the integrated circuit card of FIG. 1 as taken along the lines 3—3 of FIG. 1.
Figure 4:
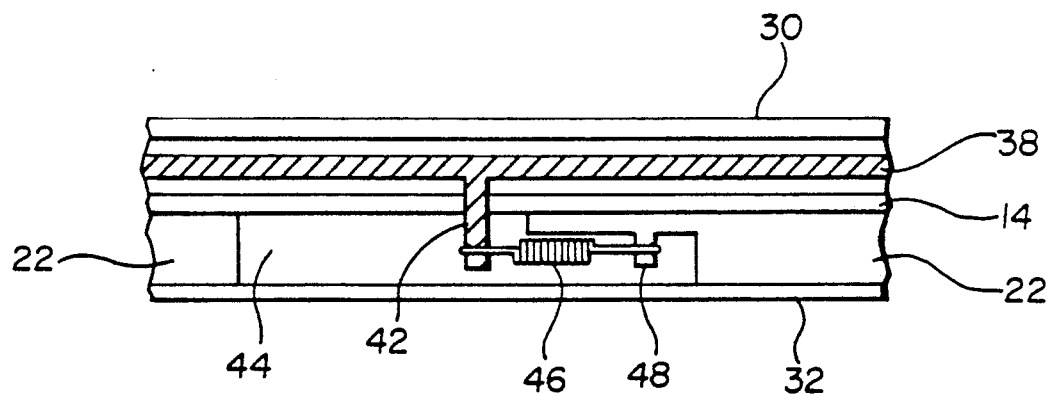
FIG. 4 is a detail elevation of the integrated circuit card of FIG. 1 as taken along the lines 4—4 of FIG. 1.

As best shown in FIGS. 1 and 3, a shutter 38 is supported in the frame 20 between the upper cover 30 and the substrate 14. A tab 40 extends from the shutter into the opening recess 34. The opening recess 34 and the tab 40 therewith are situated along the lateral wall 24 rearwardly of a forward surface 38a of the shutter 38. The shutter 38 has a lug 42 extending from each side thereof into respective cavities 44 (FIG. 4) in each side wall 22 and 24. As shown in FIG. 4, a spring 46 is attached between the lug 42 and a post 48 extending from the side wall 22 (or 24). The shutter 38 is thus supported for movement within the frame 20 such that the springs 46 tension the shutter 38 forwardly as shown in FIG. 1 toward a closed position in which the forward surface 38a covers the contact pattern 18 on the substrate 14.

Figure 6:
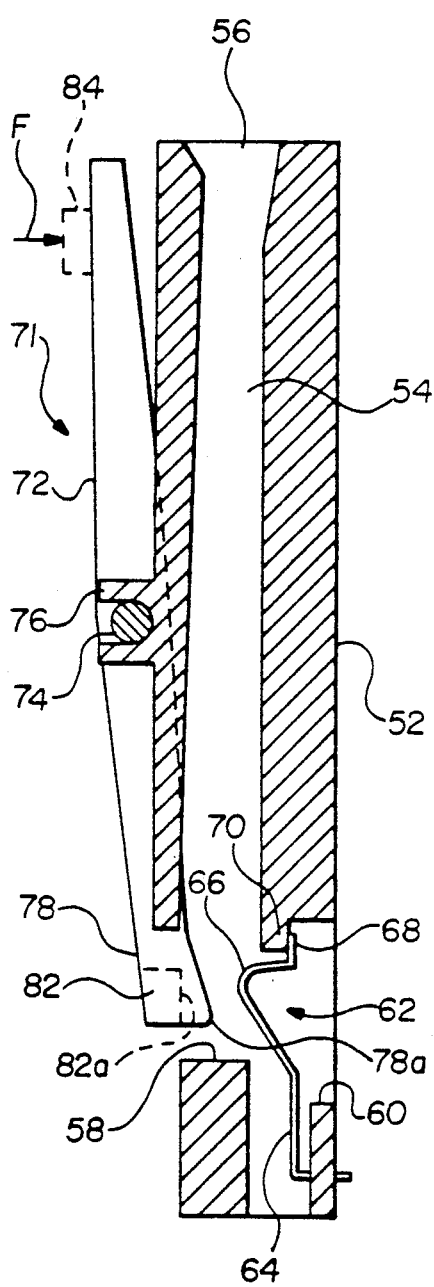
FIG. 6 is a side elevation of the electrical connector of FIG. 5 as taken along the lines 6—6 of FIG. 5.
Figure 5:
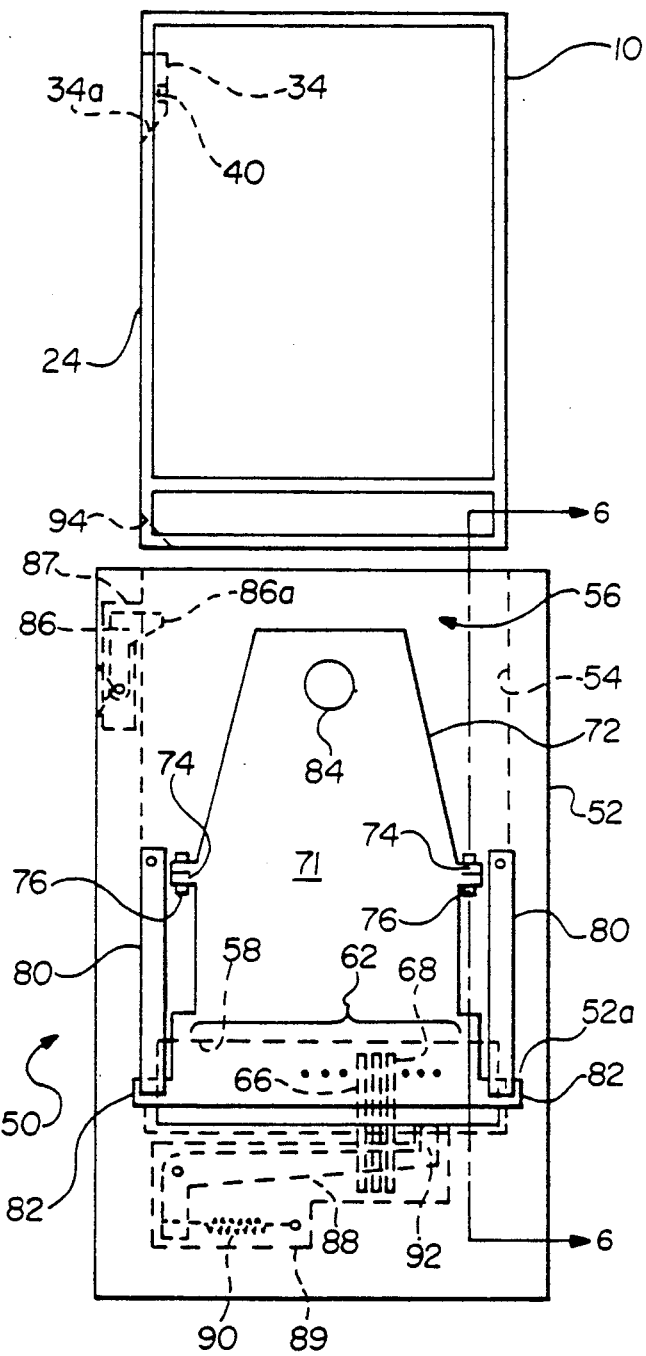
FIG. 5 is a plan view of an electrical connector embodying the features of the invention.

Referring now to FIGS. 5 and 6, the card 10 is shown in relation to an electrical connector 50 embodying the features of the invention. The connector 50 includes a housing 52 having a recess 54 for receiving the card 10 through an open end 56 and a pair of openings 58 and 60 disposed in opposed relation toward an opposite end thereof. A plurality of flexible contact electrodes 62 each have a long arm 64 and a spring contact 66 terminating in a spring stop 68 that is pretensioned against a ledge 70 formed adjacent the opening 60. The configuration of each flexible electrode 62, particularly with its relatively long arm 64, forms a beam spring having a relatively low spring rate, that is, relatively small amounts of force are sufficient to provide relatively large displacement of the contact arm 66.

A card engaging member 71 includes a latching lever 72 having a pivot 74 mounted in bearings 76 formed in the housing 52, and a card engaging extension 78 formed on one end of the lever 72 overlying the opening 58 in the housing 52. The card engaging extension 78 is biased into the opening 58 by a pair of leaf springs 80 bearing upon respective shoulders 82 extending from the lever 72 and forcing the lever 72 to turn on its pivot 74. The lever 72 thus pivots toward the housing until a face 82a on the shoulders 82 contacts the housing at 52a. In this position, a locking profile 78a on the underside of the extension 78 projects into the recess 58 toward the electrodes 62. A force F is applied to a knob 84 on one end of the lever 72 to pivot the lever counter to the spring tension such that the card engaging extension 78 may be lifted out of the opening 58. This force may be manually provided, such as by a finger, or it may be mechanically or electro-mechanically provided, e.g., by a solenoid (not shown).

A shutter opener 86 is pivoted within a slot 87 in the housing 52 such that a portion 86a of the opener 86 projects into the recess 54 to engage and open the shutter 38 when the card 10 is inserted into the housing 52. The resilient bias from the spring-loaded shutter 38 acts against the shutter opener 86 to provide a rearwardly-directed force that tends to eject the card 10 from the recess 54. Depending upon the amount of force provided by the spring-loaded shutter 38 and the condition of the card 10 (whether it is warped or otherwise misshapen so as to make difficult a trouble-free insertion and ejection), it may be desirable to provide an additional ejection force. For example, (as shown in FIG. 5) an ejection lever 88 may be mounted within a recess 89 in the housing 52 for pivoting a portion 92 into the recess 54 and into contact with the inserted card 10.

Figure 7:
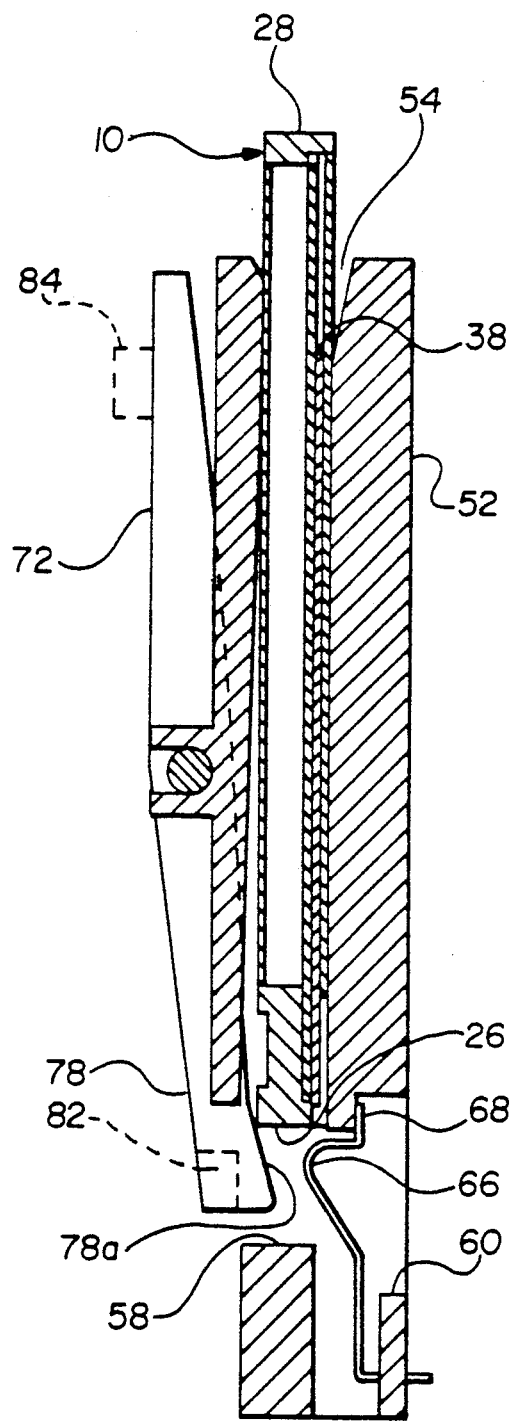
FIG. 7 is a side elevation as depicted in FIG. 6 showing the card partly inserted into the electrical connector.
Figure 8:
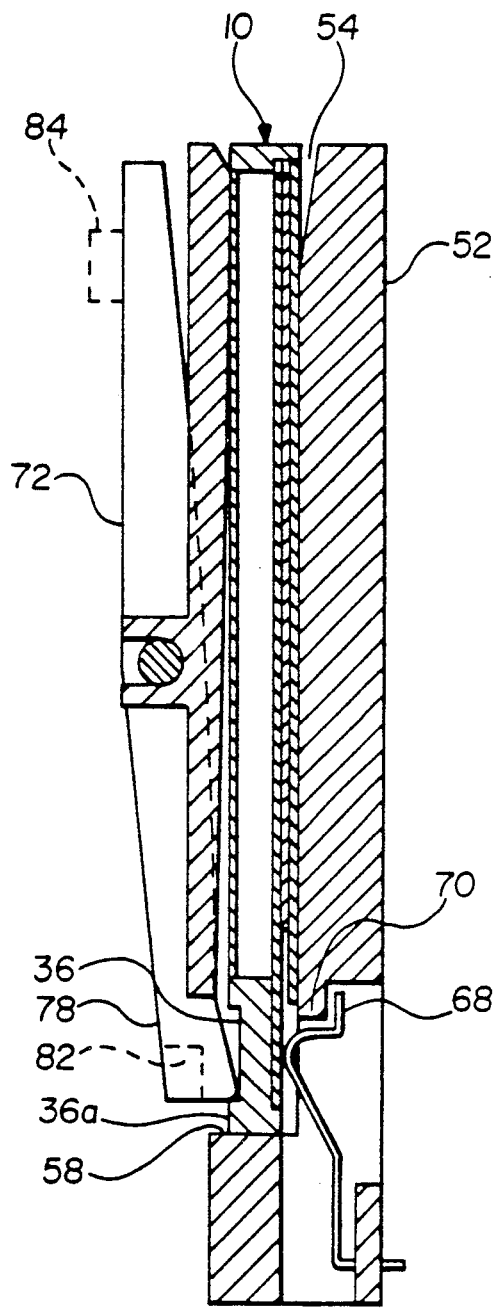
FIG. 8 is a side elevation as depicted in FIG. 6 showing the card fully inserted into the electrical connector.
Figure 9:
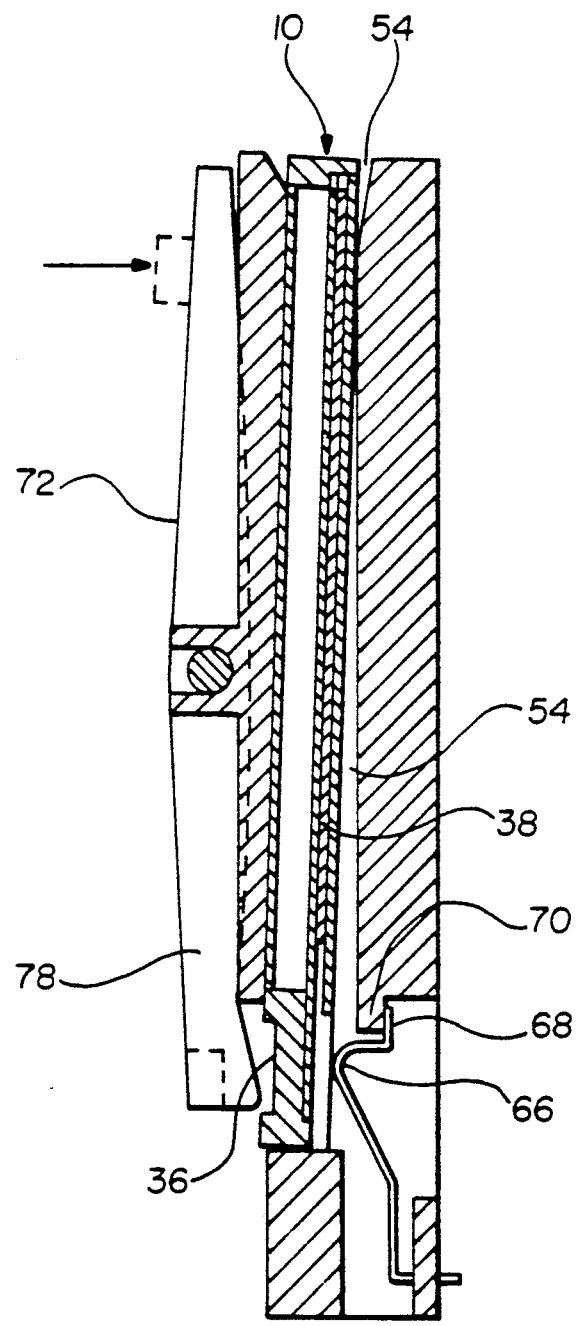
FIG. 9 is a side elevation as depicted in FIG. 6 showing the card being ejected from the electrical connector.

Referring now to FIGS. 7 through 9, the card is shown being inserted into the recess 54 (FIG. 7), locked in place in the recess 54 (FIG. 8), and ejected from the recess 54 (FIG. 9). As the card 10 is being inserted into the recess 54 in the housing 52, a chamfer 94 (see FIG. 5) on a corner of the card 10 cams the shutter opener 86 back into the slot in the housing 52. This is useful to prevent a wrong-way insertion of the card 10. As the card 10 is further inserted into the recess 54, the shutter opener 86 rides along the side wall 24 of the card 10 until it slides into the opening recess 34 and engages the tab 40. Further movement of the card 10 forces the shutter 38 rearward against the tension of the springs 46, in Particular sliding the forward surface 38a of the shutter 38 backward and exposing the contact pattern 18.

At this time the front wall 26 of the card 20 contacts the shallow ramp angle that forms the locking profile 78a of the card-engaging extension 78 and cams the lever 72 clockwise, that is, out of the opening 58 (see FIG. 7). A large mechanical advantage is obtained as the card 10 encounters the shallow ramp angle and therefore the card insertion force is kept low. At the same time, the front wall 26 of the card 10 ramps the contact electrodes 66 outwardly from the recess 54. As the card 10 is further pushed into the recess 54, the locking profile 78a of the extension 78 of the lever 72 falls into the locking slot 36 on the card 10 and the card 10 is securely locked in the housing 52 with the contact electrodes 66 in electrical contact with the contact area 18. In particular, the extension 78 is firmly engaged against the forward wall 36a of the slot 36 by the combined force of the resilient bias from the spring-loaded shutter 38 acting against the shutter opener 86 and the ejection lever 88 acting against the front wall 26 of the card 10. The elongated dimension of the locking profile 78a (as appreciated from FIG. 5) evenly distributes the force of the biasing springs 80 over the locking slot 36, thus ensuring a well-distributed frictional contact between the electrodes 62 and the contact pattern 18.

As seen in FIG. 7, the lever extension 78 and the spring contacts 66 are separated by a distance that is less than the thickness of the card 10 (measured from the floor of the locking slot 36 to the surface of the contact pattern 18). In particular, by biasing the lever shoulder 82 against the housing 52 (as best shown in FIG. 5) and by pretensioning the spring stop 68 against the ledge 70 so as to carefully define the distance therebetween, deflections of both members can be minimized and well-controlled. As the card is inserted, the lever extension 78 and the spring contacts 66 are ramped apart, allowing the locking profile 78a of the lever extension 78 to snap into place in the locking slot 36. FIG. 8 shows the card 10 fully inserted into the housing 52. The lever 72, under action of the leaf springs 80, pushes the card 10 firmly against the contact electrodes 66 such that the contact area 18 in the card 10 makes reliable electrical connection with the electrodes 62. In doing this, the spring stop 68 is forced away from the ledge 70.

When the lever 72 is rotated clockwise as shown in FIG. 9, the extension 78 disengages from the locking slot 36, thereby freeing the card 10 for movement. Initially, the spring contacts 66 push against the card 10, moving the card 10 outward until the spring stops 68 strike the ledge 70. Since there are now no retaining or contact forces acting upon the card 10, the card 10 is free to eject from the recess 54 under action of the resilient bias from the spring-loaded shutter 38 acting against the shutter opener 86 (see FIG. 5). Furthermore, the inserted card had forced the ejection lever 88 to move clockwise against the resilient force of the spring 90. When the lever 72 is disengaged from the locking slot 36, the ejection lever 88 exerts rearwardly-directed force upon the card 10 that contributes to the forces urging the card 10 from the housing 52. (Depending on the strength of the bias exerted by the spring-loaded shutter 38 against the shutter opener 86, the ejection lever 88 may be unnecessary.) When pressure against the lever 72 is released, the card 10 will assume the position shown in FIG. 7, with the card 10 partially ejected. This allows the card 10 to be gripped toward its rear wall 28 and readily removed from the electrical connector 50.

The invention has been described in detail with particular reference to a presently preferred embodiment, but it will be understood that variations and modifications can be effected within the spirit and scope of the invention. For example, the card-engaging function performed by the latching lever 72 is to exert a force opposite to the contact electrodes 62. Other card-engaging configurations, such as a leaf spring, can be an alternative to a lever as long as some mechanism is provided for withdrawing the member from the locking slot 36 on the card.

What is claimed is:

1. Electrical connector apparatus providing connection to a contact area on a removable integrated circuit card, said card including a card locking member on a side opposite to the contact area, said connector apparatus comprising:

a housing having a recess for receiving the integrated circuit card;

flexible contact means for electrically connecting with the integrated circuit card, said contact means being pretensioned to project into said recess by a spring force;

a card engaging member supported for entry into said recess in opposed relation to said contact means, said card engaging member including a locking profile configured to engage said card locking member; and means for biasing said card engaging member toward said contact means whereby the integrated circuit card is engaged therebetween and tensioned from opposing sides thereof to effect electrical connection between said contact means and said contact area on the card, said card locking member and said locking profile cooperatively engaging to secure the integrated circuit card in said recess.

2. Apparatus as claimed in claim 1 wherein said card engaging member is adapted for counter-movement out of said recess, whereby said locking profile is disengaged from said card locking member and the integrated circuit card is conditioned for ejection from said recess.

3. Apparatus as claimed in claim 1 wherein said card locking member is a locking slot on a side opposite to the contact area, said locking profile being situated toward one end of said card engaging member and engaging said locking slot to secure the integrated circuit card in said recess.

4. Apparatus as claimed in claim 3 wherein said card engaging member is a lever pivoted to enter the recess, said lever having the locking profile on one end thereof for entering the recess and engaging the locking slot.

5. Apparatus as claimed in claim 4 wherein said locking slot is generally coextensive with the pattern area and said locking profile of said lever is sufficiently elongated to evenly distribute the force of said biasing means over the locking slot.

6. Apparatus as claimed in claim 3 wherein the card includes a slidable shutter and resilient means for urging the shutter over the contact area when the card is removed from the connector apparatus, said connector apparatus further including a shutter opener that engages and drives the shutter to an open position wherein the contact area is exposed to said contact means.

7. Apparatus as claimed in claim 6 wherein the resilient means in the card spring-loads the shutter toward a closed position, the locking profile of said card engaging member interacting with the locking slot in the card to secure the integrated circuit card in said recess against the resilient bias from the spring-loaded shutter.

8. Apparatus as claimed in claim 7 wherein said card engaging member is adapted for counter-movement away from the locking slot, whereby the locking profile is withdrawn from the locking slot and the integrated circuit card is ejected from the recess under action of the resilient bias from the spring-loaded shutter acting against the shutter opener.

9. Electrical connector apparatus providing connection to a contact area on a removable integrated circuit card supporting at least one circuit element, said contact area including a plurality of contact elements connected to the circuit element for transferring data between the card and electronic apparatus connected to the connector apparatus, the integrated circuit card including a case for substantially enclosing the circuit elements, the case having an open portion for exposing the contact area to the connector apparatus and a locking slot located on the case opposite to said open portion, said electrical connector apparatus comprising:

a housing for receiving the integrated circuit card, said housing having an opening overlying the contact area of the card when received into the housing;

a plurality of contact electrodes supported in said opening for respectively contacting said plurality of contact elements in said received card, said electrodes being pretensioned to project into the opening by a spring force;

card latching means for acting upon the card in opposed relation to said contact electrodes and latching the integrated circuit card inside the housing, said latching means having a locking profile situated opposite to the contact area of the received card for entering the locking slot when the card is fully received into said housing to secure the card in said housing, whereby the integrated circuit card is engaged between said latching means and said contact electrodes and electrical connection is established between said electrodes and the contact area.

10. Apparatus as claimed in claim 9 in which said card latching means comprises:

a lever supported for movement relative to the housing, said lever having a locking profile depending from one end thereof situated opposite to the contact area of the received card; and means for tensioning said locking profile toward the contact area of a received card from an opposite side thereof whereby the card is located between the locking profile and said contact electrodes, said tensioned lever forcing the card and the contact area therewith against the resilient bias from the pretensioned contact electrodes in order to make effective electrical contact.

11. Apparatus as claimed in claim 10 wherein the card includes a slidable shutter and resilient means for urging the shutter over the contact area when the card is removed from the connector apparatus, said connector apparatus further including a shutter opener that engages and drives the shutter to an open position wherein the contact area is exposed to said contact means.

12. Apparatus as claimed in claim 11 wherein the resilient means in the card spring-loads the shutter toward a closed position, the locking profile of said lever interacting with the locking slot in the card to secure the integrated circuit card in said recess against the resilient bias from the spring-loaded shutter.

13. Apparatus as claimed in claim 12 wherein said lever is adapted for counter-movement away from the locking slot, whereby the locking profile is withdrawn from the locking slot and the integrated circuit card is ejected from the recess under action of the resilient bias from the spring-loaded shutter acting against the shutter opener.

14. Electrical connector apparatus providing connection between a removable integrated circuit card, supporting at least one storage element, and electronic apparatus for processing data stored in the storage element, said card having a contact area including a plurality of contact elements connected to the storage element, a locking region on a side opposite to the contact area, and a slidable shutter and resilient means for urging the shutter over the contact area when the card is removed from the connector apparatus, said electrical connector apparatus comprising:

a housing for receiving the integrated circuit card, said housing having a first opening overlying the contact area of a received card and a second opening in generally opposed relation to said first opening;

a shutter opener that engages and drives the shutter to an open position wherein the contact area is exposed to said contact means;

a plurality of contact electrodes pretensioned by a spring force to project through said first opening and respectively contact said plurality of contact elements in the received card;

card locking means having a locking extension that is rotatably positioned to enter said second opening;

means for tensioning said card locking means toward said second opening such that the locking extension penetrates said second opening and acts upon the locking region of the card in opposed relation to said contact electrodes, whereby the integrated circuit card is captured between said locking extension and said contact electrodes.

15. Apparatus as claimed in claim 14 wherein the resilient means in the card spring-loads the shutter toward a closed position, the locking extension of said locking means interacting with the locking region of the card to secure the integrated circuit card in said housing against the resilient bias form the spring-loaded shutter.

16. Apparatus as claimed in claim 15 wherein said locking means is adapted for counter-movement away from the locking region, whereby the locking extension is withdrawn from the locking region and the integrated circuit card is ejected from the housing under action of the resilient bias from the spring-loaded shutter acting against the shutter opener.

* * * * *